(12) United States Patent
Edelson et al.

(10) Patent No.: US 6,351,545 B1
(45) Date of Patent: Feb. 26, 2002

(54) MOTION PICTURE ENHANCING SYSTEM

(75) Inventors: Steven D. Edelson, Wayland, MA (US); Klaus Diepold, Siegertsbrunn (DE)

(73) Assignee: DynaPel Systems, Inc., New York, NY (US)

( * ) Notice: Subject to any disclaimer, the term of this patent is extended or adjusted under 35 U.S.C. 154(b) by 0 days.

(21) Appl. No.: 09/459,988

(22) Filed: Dec. 14, 1999

(51) Int. Cl.[7] .................................................. G06K 9/00
(52) U.S. Cl. ...................................... 382/107; 348/155
(58) Field of Search ......................... 382/107; 375/240; 352/85; 348/155

(56) References Cited

U.S. PATENT DOCUMENTS

| | | |
|---|---|---|
| 4,575,756 A | 3/1986 | Furukawa |
| 4,651,207 A * | 3/1987 | Bergmann et al. ........... 375/240 |
| 4,727,422 A | 2/1988 | Hinman |
| 4,838,685 A * | 6/1989 | Martinez et al. .............. 352/85 |
| 4,985,768 A | 1/1991 | Sugiyama |
| 5,121,202 A | 6/1992 | Tanoi |
| 5,121,377 A | 6/1992 | Short |
| 5,386,234 A | 1/1995 | Veltman et al. |
| RE35,093 E | 11/1995 | Wang et al. |
| RE35,158 E | 2/1996 | Sugiyama |
| 5,742,344 A | 4/1998 | Odaka et al. |
| RE35,910 E | 9/1998 | Nagata et al. |
| 5,825,421 A * | 10/1998 | Tan ............................. 375/240 |
| 5,859,668 A | 1/1999 | Aono et al. |
| 5,982,440 A | 11/1999 | Aoki |
| 6,133,789 A * | 10/2000 | Braitwaite .................. 330/149 |
| 6,154,491 A * | 11/2000 | Uetani ........................ 375/240 |

* cited by examiner

Primary Examiner—Leo Boudreau
Assistant Examiner—Abolfazl Tabatabai
(74) Attorney, Agent, or Firm—Richard L. Aitken; Venable

(57) ABSTRACT

In the motion picture display system, successive frames of a motion picture are compared to determine the dense motion vector fields representing the change of position of image elements in the images represented by the frames. Interpolated frames are generated by scaling the vectors of the dense motion vector fields to a fraction of their original magnitudes and moving image elements in the corresponding frames to positions in the interpolated frames in accordance with the dense motion vector fields. The invention is used to eliminate jerky motion in low frame rate motion pictures and also to provide slow motion in high frame rate motion pictures.

4 Claims, 5 Drawing Sheets

MOTION PICTURE ENHANCING SYSTEM

This invention relates to a method and apparatus for improving the quality of the reception of motion pictures and, more particularly, to an improved method and apparatus for interpolating motion picture images between images of a sequence comprising a motion picture.

BACKGROUND OF THE INVENTION

In a motion picture, motion is simulated by a sequence of images at spaced time intervals typically at a rate of 24–30 images per second. Frame rates less than 24–30 frames per second are sometimes used because of bandwidth limitations, such as Internet applications, or because of economic or data storage limitations. However, when the frame rate is reduced much below 24 frames per second, the quality of the perception of the motion picture is degraded. Specifically, moving objects, instead of appearing to move continuously in the scene, are perceived to have a jerky motion in which the objects move in a series of abrupt transitions from position to position in the displayed scene.

In Internet applications and in other applications in which the bandwidth is limited, systems have been designed to enable a low frame rate to be transmitted by generating the picture at a high frame rate, determining motion vectors between the frames of the motion picture representing the motion of the objects from frame to frame in the motion picture, then transmitting only every other frame or less to the receiver over the communication channel along with the motion vectors. The motion vectors and the transmitted frames are then used to generate intervening frames which correspond to the frames that were eliminated from the motion picture at the transmitter and then the sequence of images comprising the transmitted frames and interpolated frames are then displayed as a motion picture at the receiver.

The above-described system is effective in eliminating the jerky motion as perceived by the viewer, but it requires a specially designed transmitter equipment to generate the motion vectors and the motion vectors use up bandwidth in the transmission channel.

SUMMARY OF THE INVENTION

In a preferred system of the present invention, jerky motion perception is eliminated from low frame rate motion pictures without the need of special transmitting equipment and without the need for motion vectors to be transmitted to the receiver from a transmitter. The system of the invention in fact requires no transmitter and, in many applications, has no transmitter. In accordance with the invention, the motion of image elements, in a motion picture represented by a sequence of motion picture frames, is detected. The term "image element" as used herein refers to a pixel sized element of a depicted scene and objects in that scene whereby an image element representing a part of an object which is moving is considered to move with the object. The motion picture may be a sequence of images at a low frame rate. In accordance with the invention, a dense vector field of forward vectors representing the changes in positions of image elements from each frame to each succeeding frame in the sequence are computed. In addition, a dense field of backward vectors are detected for the changes in position of the image elements from each frame to the preceding frame. The forward vectors are scaled to a fraction of their original magnitude and motion adjusted images are generated from the scaled forward vectors by moving each image element in the first frame to positions in the motion adjusted images as indicated by the scaled forward vectors. In addition, one or more second motion adjusted images are generated by scaling the backward vectors by a fraction of their original magnitude and moving the image elements in the succeeding frame to positions in the second motion adjusted images in accordance with the scaled backward vectors. The motion adjusted images are then merged into interpolated frames. The above process is repeated for each successive overlapping pair of adjacent frames in the motion picture sequence. The interpolated frames are interleaved with the original frames and the resulting sequence is displayed to display the motion picture with the jerky motion eliminated or greatly reduced. In a specific embodiment, one interpolated frame is generated for each pair of adjacent frames to be positioned in time halfway between the corresponding pair of frames. Accordingly, in this system, the forward and backward vectors are scaled by onehalf to correspond to the position of the interpolated frame.

DESCRIPTION OF THE PREFERRED EMBODIMENTS

Figure 1:
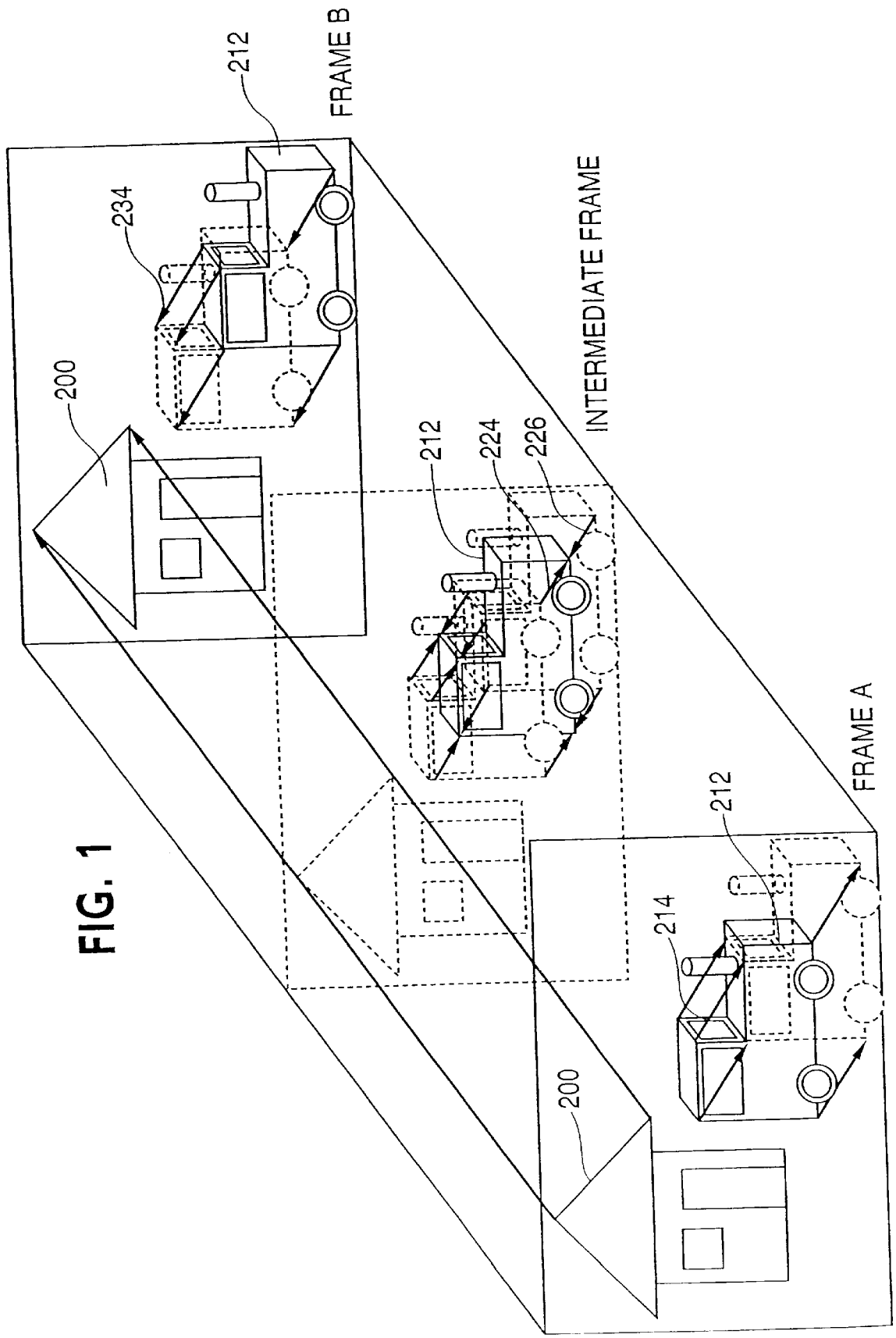
FIG. 1 schematically illustrates the method of the present invention.

In accordance with the method of the invention illustrated in FIG. 1, frames are interpolated between successive frames of a scene representing a motion picture containing one or more moving objects. In FIG. 1, two successive frames, frame A and frame B, of a low frame rate motion picture are shown. The frames depict a stationary object in the form of a station house 200 and a moving object in the form of an engine 212. As shown in frames A and B, the engine 212 has moved from a central position in frame A toward the lower right-hand corner of the scene as shown in frame B. The forward vectors 214 represent the motion of the image elements depicting the engine in the time interval between frames A and B. The frames A and B are compared to generate a dense forward vector field wherein a vector value is generated for each pixel in the image shown in frame A to indicate where the corresponding image element has been moved in the image in frame B. In the example represented in FIG. 1, all of the image elements stay in the same position except the image elements representing the engine 212. For the image elements representing the engine 212, vectors 214 in the dense forward vector field are computed from the change in the position of the image elements depicting the engine 212 from frame A to frame B. Since the remaining image elements do not change position from frame A to frame B, the vectors for these stationary image elements will have a zero magnitude in the dense forward vector field. In a similar manner, a dense backward vector field is generated representing the difference in the image element position from frame B to frame A. Thus, the dense backward vector field will contain backward vectors 234 corresponding to the image elements depicting the engine computed from the difference in the positions of the pixels depicting engine 212 in frame A from their position in frame B. As in the case of the dense forward vector field, vectors in the dense backward vector field which correspond to image elements which do not change in position from frame B to frame A, have zero magnitude. The term "dense vector field" as used herein means a set of vectors representing image element motion wherein the vectors have substantially the same density as the pixels or the image elements of the motion picture frames.

The magnitudes of the vectors 214 and 234 are scaled to correspond to the location in time of the frame being interpolated between the frames A and B. Since the interpolated frame in the specific embodiment will be equally spaced in time from frame A and frame B, the magnitudes of the forward vectors and the backward vectors are reduced by one-half, resulting ½ scale forward vectors 224 and ½ scale backward vectors 226. A first motion adjusted image is then generated from frame A and the ½ scale dense forward vector field. The first motion adjusted image will be derived from frame A by moving the image elements of frame A in accordance with the ½ scale forward vectors. All of the image elements of frame A which do not depict the engine 212 and for which the forward vectors have a magnitude of zero stay in the same position in the first motion adjusted image. Thus, the image elements depicting the engine 212 are moved in the first motion adjusted image to positions as indicated by the ½ scale forward vectors 224, and, in the first motion adjusted image, the engine will appear halfway between its position in frame A and frame B. A second motion adjusted image is generated in a similar manner from frame B and the ½ scale backward vector field.

In a practical application, the dense motion vector field may represent changes in object size, three-dimensional motion and other complex motion. When the vectors of the dense motion vector field are scaled, they will sometimes call for placing more than one image element in the motion adjusted image in the same position. In the simplified example of FIG. 1, the image element depicting the lower lefthand corner of the engine 212 will be moved by its scaled forward vector to the position of a stationary image element so that in the motion adjusted image, two image elements will be assigned to the same position. This phenomena may be handled by a simple algorithm, such as by averaging the image elements, or by a simple rule or by means of additional image information. The end result may not be an ideal representation of the corresponding image element in the motion adjusted image, but the result does not critically affect the overall motion picture quality.

After the first and second motion adjusted images are generated, they are merged to form an interpolated image. A simple algorithm for merging the two motion adjusted images would be to average the corresponding image elements in the two motion adjusted images. Preferably, the algorithm for blending the image elements in the merged image determines whether the image element from the first frame or the second frame is a better representation of a given pixel in the interpolated frame. The preferred merging algorithm detects for each image element in the interpolated frame whether it is subject to occlusion or innovation phenomena. An occlusion phenomena is detected for an image element in the interpolated frame when the image element is visible in the first frame and is not visible in the second frame, thus indicating that the image element in the second frame has been occluded by a moving object. In this case, the image element from the first motion adjusted image is selected for the corresponding pixel in the interpolated image. An innovation phenomena is detected when an image element that was not visible in the first frame becomes visible in the second frame. In this case, the image element from the second motion adjusted image is selected for the corresponding pixel in an interpolated frame. Image elements which are not detected as being subject to occlusion or innovation phenomena from the image elements as represented in the first and second motion adjusted images are averaged in the interpolated frame.

The process as represented by FIG. 1 is repeated for each frame interpolated from each successive overlapping pair of adjacent frames in the low frame rate motion picture. The term "successive overlapping pairs of adjacent frames" refers to the sequence wherein, if the successive frames are labeled A, B, C, D, then the frames B and C are a successive overlapping pair of adjacent frames to the pair of adjacent frames A and B and the frames C and D are a successive overlapping pair of adjacent frames to the pair of adjacent frames B and C.

Figure 2:
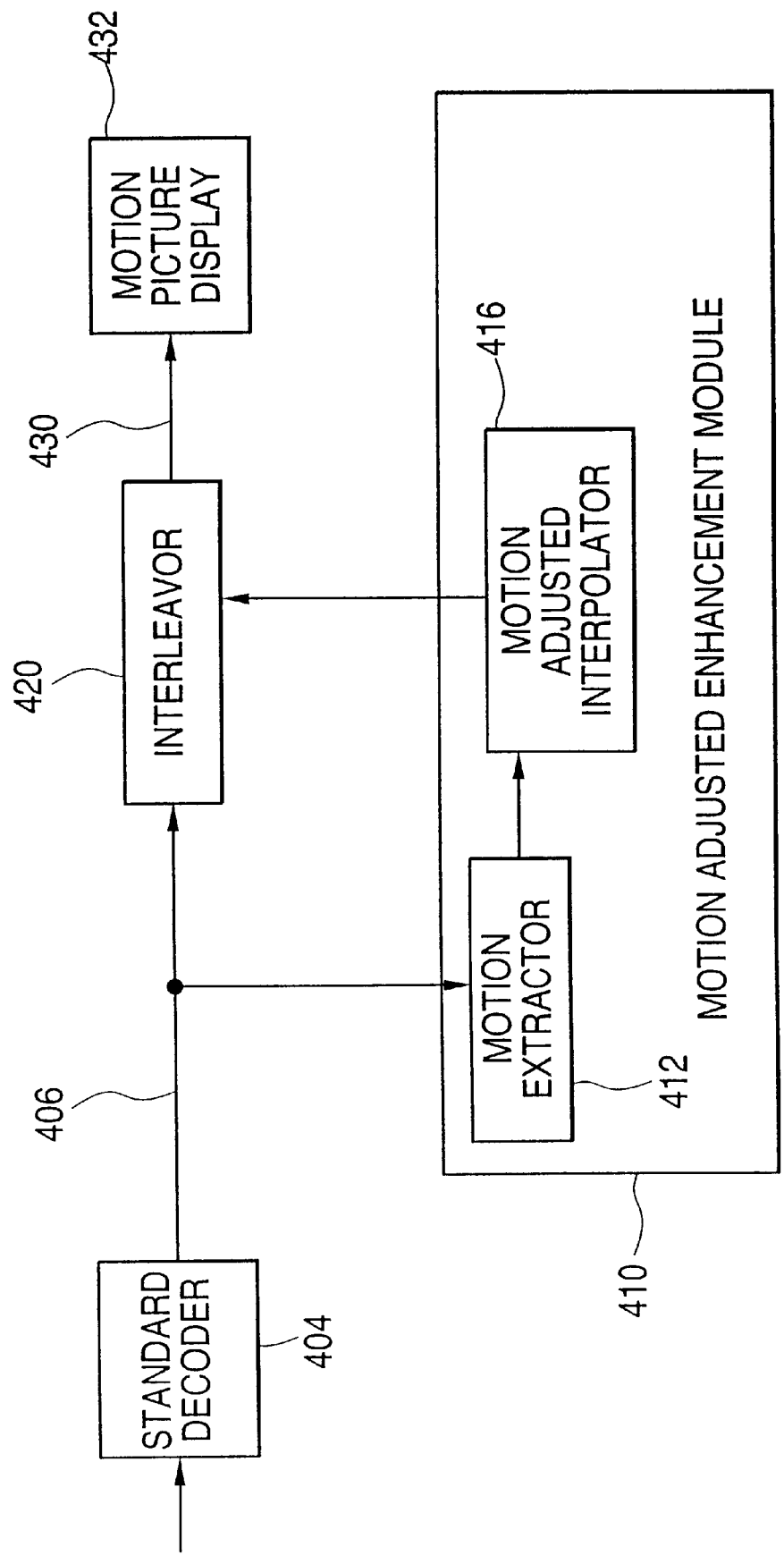
FIG. 2 is a block diagram of a preferred system of the present invention.

In the system of the invention as shown in FIG. 2, a standard compressed bit stream representing a low frame rate video motion picture in digital form is applied to a standard decoder 404. The low frame rate motion picture may be a representation of the motion picture in which alternate frames have been discarded or may represent a motion picture originally produced at a low frame rate, such as by a low frame rate motion picture or video camera. The standard decoder 404 decompresses the received bit stream into successive video frames at the received low frame rate on channel 406. Alternatively, the input bit stream need not be compressed. The video frames are applied to a motion extractor 412 of a motion enhancement module 410, which also includes a motion adjusted interpolator 416. The motion extractor 412 computes forward and backward dense motion vector fields for the image elements for each successive overlapping pair of adjacent frames as described above in connection with FIG. 1. The details of motion extraction are disclosed in German application No. 95912250.8 and in published PCT application No. WO99/07156, which are hereby incorporated by reference. The forward and backward dense vector fields are applied to the motion adjusted interpolator 416, which also receives the low frame rate video on channel 406. The interpolator 416 generates interpolated frames from the received forward and backward dense vector fields and from the corresponding low frame rate video frames in the manner described above in connection with FIG. 1. The interpolator 416 applies the interpolated frames to the interleavor 420 which interleaves the interpolated frames between the corresponding pairs of frames in the low frame rate video on channel 406 to produce a high frame rate video output on channel 430. The high frame rate video on channel 430 is then displayed by a video display device 432 or, alternatively, is stored or recorded to be displayed later.

Figure 3:
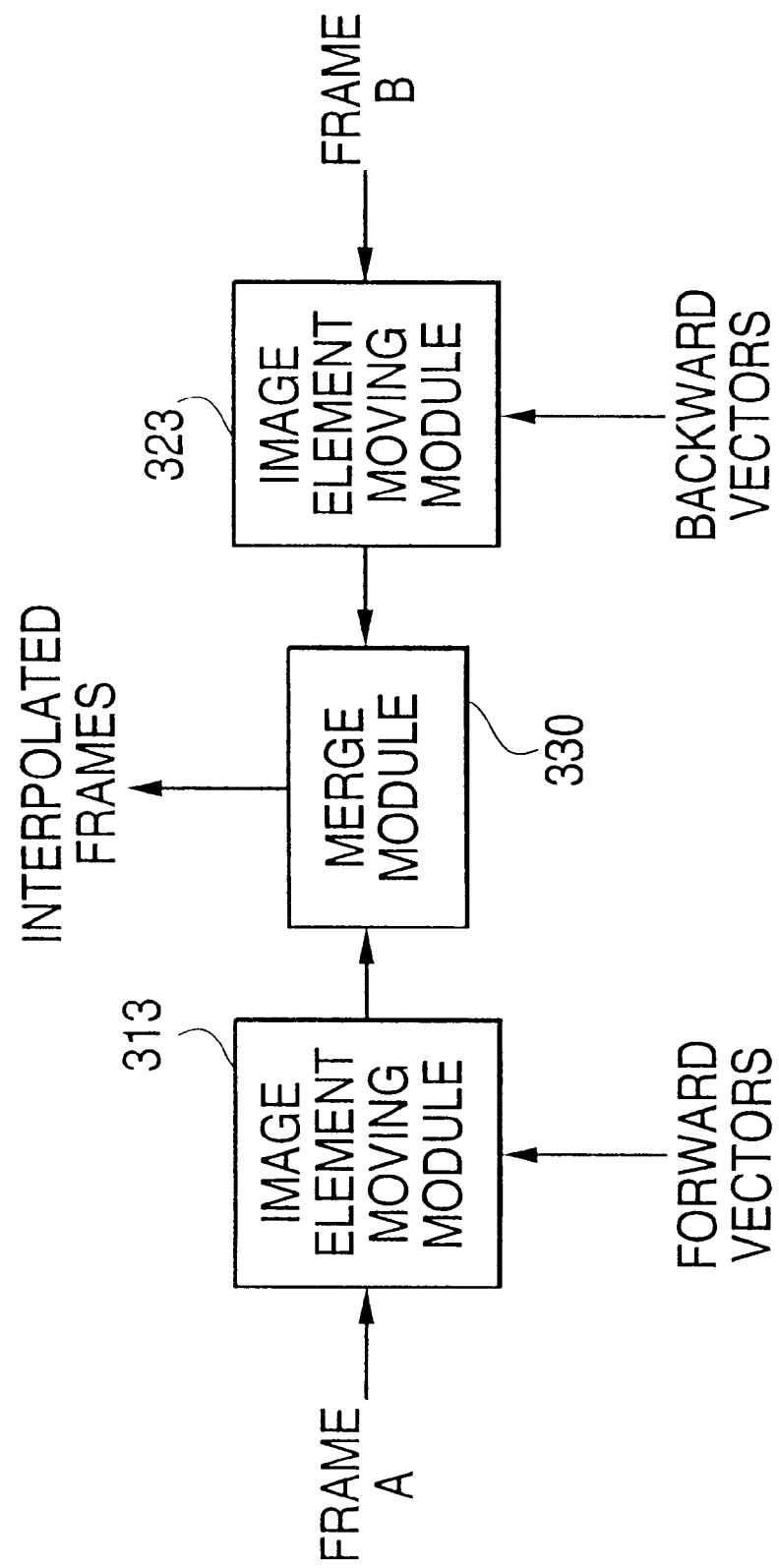
FIG. 3 is a block diagram of an interpolator employed in the system shown in FIG. 2.

FIG. 3 is a block diagram illustrating the motion adjusted interpolator and its operation. As shown in this diagram, an interpolated frame between Frames A and B is being created. Frame A is applied to the image element moving module 313 which also receives the dense forward vector field from the motion extractor 412. In the image element moving module 313, a first motion adjusted image is created by modifying frame A to move the image elements of frame A in accordance with the dense forward motion vector field received from the motion extractor 412 and scaled by ½. In a similar manner, image element moving module 323 receives frame B and the dense backward motion vector field from the motion extractor 412. The image element moving module 323 creates a second motion adjusted image by moving the image elements of frame B in accordance with dense backward motion vector field scaled by ½. The first and second motion adjusted images are then merged in module 330 to produce the interpolated frame between frames A and B. In a similar manner, the interpolator will create an interpolated frame between each successive overlapping pair of adjacent image frames. The system shown in FIG. 2 will operate on any motion picture, the frames of which are represented in digital form, and does not require a specifically constructed transmitter to transmit the motion picture frames. The system of FIG. 2 comprises a motion picture display appliance and the components thereof are accordingly colocated, or, in other words, at the same location in close proximity with one another.

Figure 4:
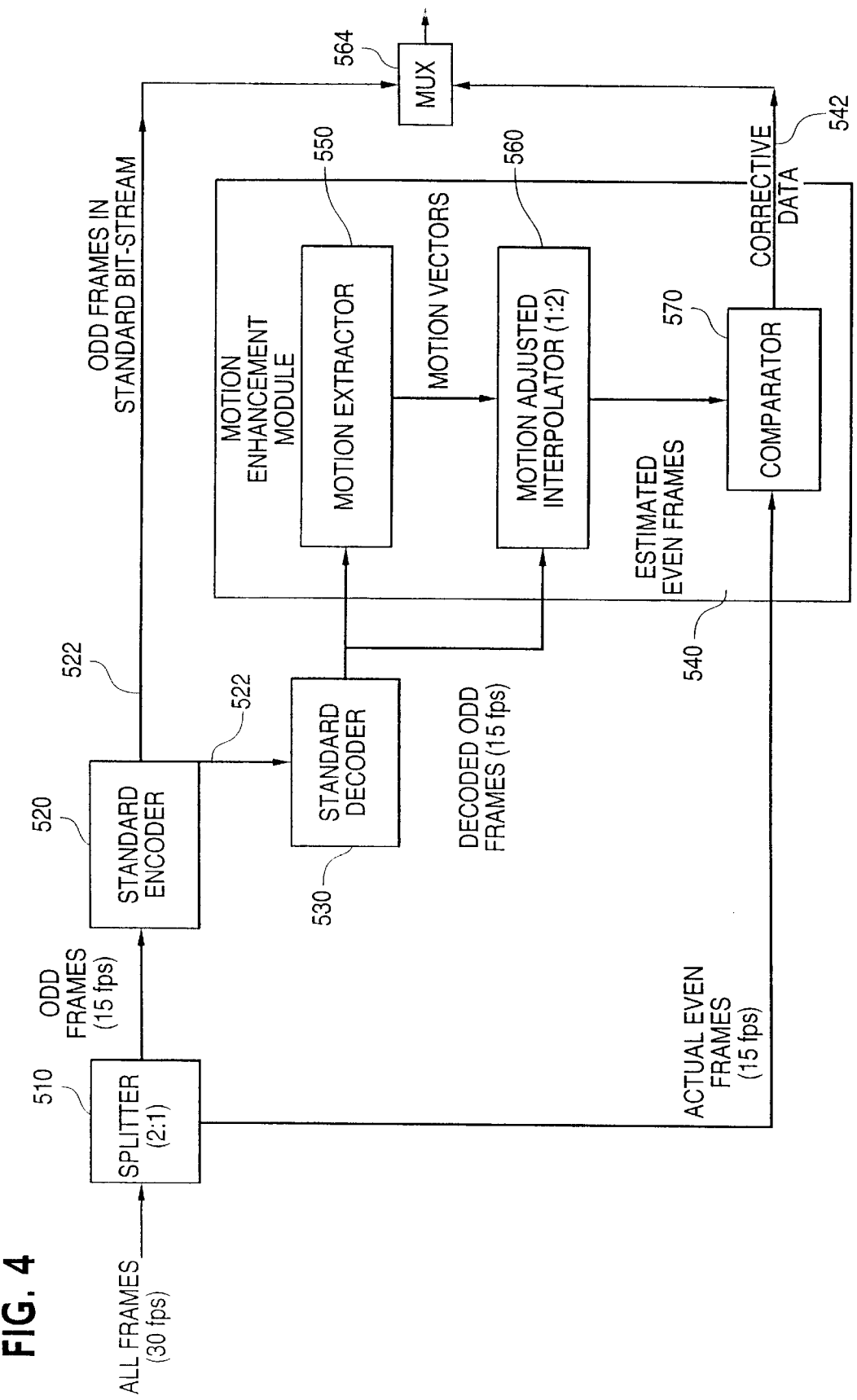
FIG. 4 is a block diagram of a motion picture transmitter in accordance with an alternative embodiment of the present invention.
Figure 5:
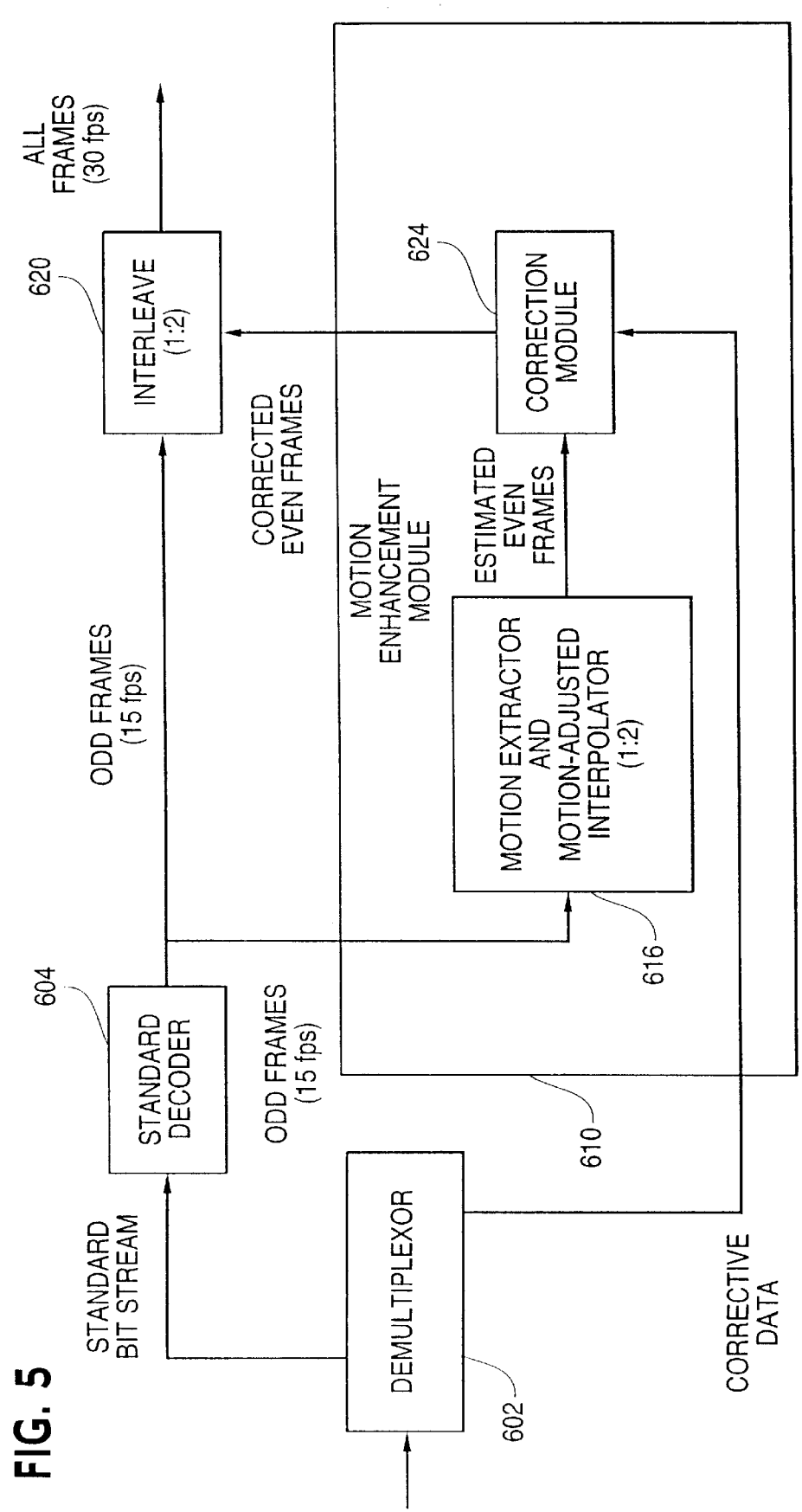
FIG. 5 is a block diagram of a motion picture receiver designed to receive data transmitted by the transmitter shown in FIG. 4 and reproduce the motion picture represented by the transmitted information with an enhanced motion picture image.

The above described system is particularly effective in improving the motion perception typical motion pictures in which there is not a lot of three-dimensional motion or in which pixels are not entering and leaving the scene very quickly. In pictures which have a lot of three-dimensional motion and/or pixels rapidly entering and/or leaving the depicted scene, the system still improves the perception of the motion picture but with visible artifacts. To reduce or eliminate these artifacts, the embodiment of the invention shown in FIGS. 4 and 5 may be used. FIG. 4 is a block diagram illustrating a transmitter of the alternative embodiment of the invention and FIG. 5 is a block diagram of a receiver of the alternative embodiment. The systems of FIGS. 4 and 5 in contrast with the system of FIGS. 2 and 3 requires a special transmitter.

As shown in FIG. 4, video data representing video frames of a motion picture at a high frame rate are received by a splitter 510 which sends alternate frames to a standard encoder 520 and sends the frames not sent to the encoder 520 to a comparator 570 in a motion enhancement module 540. To facilitate the description, it will be assumed that odd frames are sent to the encoder 520 and that even frames are sent to the motion enhancement module 540. The standard encoder 520 compresses the received odd frames and transmits the odd frames on output channel 522. The compressed video data on channel 522 representing the odd frames is applied to a standard decoder 530 which decodes the frames back to their uncompressed state as produced at the output from the splitter 510 and applies the decompressed odd video frames to a motion extractor 550 in the motion enhancement module 540. The standard decoder also applies the odd video frames to a motion adjusted interpolator 560. The motion extractor 550 produces dense forward and backward vector fields in the manner described in connection with FIGS. 1–3 and applies the vector fields to the motion adjusted interpolator 560. The motion adjustment interpolator 560 creates interpolated frames between the decoded odd frames produced by the standard decoder 530 in the manner described above in connection with FIGS. 1–3 and thus corresponding to the even frames applied by the splitter 510 to the comparator 570. If the motion adjusted interpolator 560 produced perfect interpolated frames, they would be identical to the actual even frames separated out by the splitter 510. In fact, the interpolated frames will not be perfect and, as explained above, may contain artifacts when the video content is not well suited to extract high quality motion information by interpolation. The even frames received from the splitter are applied to a comparator 570 which receives the estimated interpolated even frames produced by the motion adjusted interpolator 560. The difference between the interpolated or estimated even frames and the actual even frames applied to the comparator from the splitter are detected and the differences are transmitted as corrective data on output channel 542. The corrective data is multiplexed with the odd frames on channel 522 in multiplexer 564 and transmitted to a receiver, which is illustrated in FIG. 5.

In the receiver as shown in FIG. 5, a demultiplexer 602 separates the corrective data from the standard bit stream of compressed data representing the odd frames. The standard bit stream is applied to a standard decoder 604 which decompresses the received data and produces a sequence of video frames corresponding to the odd frames produced by the splitter 510 in the transmitter. The odd frames produced by the standard decoder 604 are applied to a motion enhancement module 610 in which the odd frames are applied to a motion extractor and motion adjusted interpolator 616 which produces interpolated frames estimating the even frames of the original data applied to the splitter 510 in the transmitter. The estimated even frames or interpolated frames are produced in the same manner as described above in connection with FIGS. 1–3. These frames are applied to a correction module 624 which receives the corrective data transmitted from the demultiplexer 602. The corrective module 624 corrects the estimated even frames in accordance with the corrective data and applies corrected even frames to an interleavor 620. The interleaver 620 then interleaves the corrected even frames with the odd frames produced by the standard decoder 604 to reproduce the sequence of video frames closely approximating those applied to the splitter 510 in the transmitter.

In the above-described specific embodiments, a single interpolated image is determined for each pair of adjacent frames and, in this specific case, the forward and reverse vectors are scaled by a factor of ½ to correspond to the position in time of the interpolated image between the adjacent frames. It will be apparent that the concept of the invention is applicable to producing more than one interpolated image between each pair of adjacent frames in which case, the forward and reverse vectors would be scaled accordingly. For example, if two interpolated images are generated between each pair of adjacent frames, the forward and reverse vectors would be scaled at one-third and two-thirds to produce two motion adjusted images from the forward vectors and two motion adjusted images from the backward vectors. The first interpolated image in the interval between the adjacent frames would then be produced from a merger of the motion adjusted image produced from the one-third scale forward vectors with the motion adjusted image produced from the two-thirds scale backward vectors. The second interpolated image in the interval between two adjacent frames would be generated by merging the motion adjusted image produced from the two-thirds scale forward vectors with the motion the adjusted image produced from the one-third scale backward vectors. In addition, the number of interpolated frames have to be an integer multiple of the number of original motion picture frames. When the interpolated frames are not integer multiple of the number of the original motion picture frames, some or most of the original motion picture frames may be discarded to maintain an even spacing of motion picture frames in the output sequence.

As described above, one purpose of the invention is to improve the quality of the display of motion pictures represented by frames at a low frame rate. The invention is also useful for purposes of slow motion in high frame rate motion pictures. For example, the input bit stream could represent a motion picture at a frame rate of 30 frames per second and the system shown in FIG. 2 could be used to generate interpolated frames between the high frame rate frames inputted to the system thus increasing the frame rate, such as by a multiple of two or more. The motion picture display device 430 would then be a slow motion display device which would display the received frames at a frame rate lower than the frame rate that the motion picture frames are received from the interleavor 420, such as at the original frame rate represented by the input bit stream. The slow motion display device 430 would have a storage capacity to store the motion picture frames received at the high rate and reproduce the motion picture frames visually at the lower frame rate. Alternatively, the output frames from the interleavor 420 could be stored in a buffer storage device and applied to the motion picture display device 430 at the desired frame rate. In another alternative slow motion system, the buffering of the motion picture frames could be carried out on the motion picture frames inputted to the system whereby the output of the interpolator when displayed would be in slow motion.

The above description is of preferred embodiments of the invention and it will be apparent that modifications may be made to the described specific embodiments without departing from the spirit and scope of the invention which is defined in the appended claims.

What is claimed is:

1. A video system comprising a video transmitter and a video receiver, said video transmitter operating to transmit a sequence of video frames to said video receiver, said transmitter comprising a splitter operable to eliminate at least half of the video frames from an original set of video frames and to transmit the remaining video frames as the sequence of video frames transmitted to said receiver, a first motion extractor connected to receive the remaining video frames from said splitter and to generate dense vector fields comprising sets of first vectors representing the change in position of image elements from frame to frame in the sequence of said remaining video frames, a first interpolator connected to said first motion extractor and connected to receive said remaining picture frames and operable to create first interpolated frames derived from corresponding ones of said remaining video frames by moving the image elements of corresponding remaining video frames to positions in the first interpolated frames in accordance with said first vectors reduced in magnitude, a comparator connected to receive from said splitter the original video frames eliminated from said original sequence of video frames and to receive said first interpolated frames and to compare the first interpolated frames with the corresponding eliminated frames to produce corrective data, said transmitter transmitting said corrective data to said receiver, said receiver comprising a second motion extractor connected to receive the sequence of video frames received by said receiver and to generate dense vector fields comprising sets of second vectors representing the change in position of image elements from frame to frame in the sequence of received video frames, and a second interpolator connected to said second motion extractor and to receive video frames received by said receiver and operable to create second interpolated frames derived from corresponding ones of the received video frames by moving the image elements of the corresponding frames to positions in the second interpolated frames in accordance with said second vectors reduced in magnitude, and a correction module connected to receive said corrective data and said second interpolated frames and to correct said second interpolated frames in accordance with said corrective data to correspond to said eliminated frames.

2. A video system as recited in claim 1 wherein said splitter eliminates every other frame and wherein said vectors are reduced in magnitude by ½ in both said transmitter and said receiver.

3. A video system as recited in claim 1 wherein said receiver further comprises an interleaver to interleave said interpolated frames in the sequence of video frames received from said transmitter.

4. A method of transmitting video data from a transmitter to a receiver, said video data comprising an original sequence of video frames representing a motion picture, comprising eliminating at least half of the video frames from said sequence of video frames at said transmitter and transmitting the remaining video frames to said receiver, generating at said transmitter dense motion vector fields comprising sets of vectors representing the change in position of image elements from frame to frame in the sequence of remaining video frames which are transmitted to said receiver, creating interpolated frames derived from corresponding ones of the remaining video frames at said transmitter by moving the image elements in corresponding remaining video frames to positions in the interpolated frames in accordance with said vectors reduced in magnitude, comparing said interpolated frames with the frames eliminated from the original sequence of video frames to produce corrective data at said transmitter, transmitting said corrective data to said receiver, deriving from the remaining frames received by said receiver dense motion vector fields comprising sets of vectors representing the change of position of image elements from frame to frame in the sequence of remaining video frames received by said receiver, creating interpolated frames at said receiver derived from the remaining video frames received by said receiver and the dense motion vector fields generated at said receiver, and correcting said interpolated frames created at said receiver in accordance with said corrective data to correspond to the original frames eliminated at said transmitter.

* * * * *